United States Patent
Paul et al.

(10) Patent No.: US 10,989,528 B2
(45) Date of Patent: Apr. 27, 2021

(54) HIGH SPEED BEAM COMPONENT-RESOLVED PROFILE AND POSITION SENSITIVE DETECTOR

(71) Applicant: Raytheon Company, Waltham, MA (US)

(72) Inventors: Justin Paul, Melissa, TX (US); Timothy C. Anderson, McKinney, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/552,997

(22) Filed: Aug. 27, 2019

(65) Prior Publication Data

US 2021/0063146 A1    Mar. 4, 2021

(51) Int. Cl.
| | |
|---|---|
| *G01B 11/27* | (2006.01) |
| *H04L 1/16* | (2006.01) |
| *H04L 5/00* | (2006.01) |
| *G01M 11/08* | (2006.01) |

(52) U.S. Cl.
CPC ........... *G01B 11/272* (2013.01); *G01M 11/08* (2013.01); *H04L 1/1671* (2013.01); *H04L 5/0057* (2013.01)

(58) Field of Classification Search
CPC .... G01B 11/272; G01M 11/08; H04L 1/1671; H04L 5/0057
USPC ................. 356/614–624, 399–401, 124, 138
See application file for complete search history.

(56) References Cited

U.S. PATENT DOCUMENTS

| | | | |
|---|---|---|---|
| 4,520,261 A | 5/1985 | Tsutsumi | |
| 4,618,759 A | 10/1986 | Muller et al. | |
| 4,707,596 A | 11/1987 | Hohberg | |
| 5,085,509 A * | 2/1992 | Gaffard | B23K 26/043 356/153 |
| 5,798,828 A | 8/1998 | Thomas et al. | |
| 2011/0007327 A1* | 1/2011 | Bridges | G01B 11/002 356/622 |
| 2011/0170113 A1* | 7/2011 | Bridges | G01B 11/026 356/482 |
| 2012/0262728 A1* | 10/2012 | Bridges | G01S 7/4808 356/614 |
| 2016/0298956 A1* | 10/2016 | Li | A61B 3/10 |
| 2016/0305774 A1* | 10/2016 | Ross, Jr. | G02B 27/34 |
| 2017/0151089 A1* | 6/2017 | Chernyak | A61F 9/00829 |
| 2017/0192094 A1 | 7/2017 | Marron et al. | |

FOREIGN PATENT DOCUMENTS

| | | |
|---|---|---|
| CN | 106546130 B | 2/2019 |
| CN | 109373816 A | 2/2019 |
| JP | H07183197 A | 7/1995 |

OTHER PUBLICATIONS

International Search Report dated Aug. 10, 2020 in connection with counterpart International Patent Application No. PCT/US2020/029816, 4 pages.

Written Opinion of the International Searching Authority dated Aug. 10, 2020 in connection with counterpart International Patent Application No. PCT/US2020/029816, 6 pages.

* cited by examiner

*Primary Examiner* — Isiaka O Akanbi

(57) ABSTRACT

A system includes a beam splitter, camera, and a position sensitive detector (PSD). The beam splitter splits a beam ensemble into a first beam portion and a second beam portion. The camera PSD detects an image profile of the first beam portion. The PSD detects a position of the second beam portion.

20 Claims, 5 Drawing Sheets

HIGH SPEED BEAM COMPONENT-RESOLVED PROFILE AND POSITION SENSITIVE DETECTOR

GOVERNMENT RIGHTS

This invention was made with U.S. government support under contract number W9113M-17-D-0006-0002 awarded by the Department of Defense. The U.S. government may have certain rights in this invention.

TECHNICAL FIELD

This disclosure is directed in general to laser weapon systems. More specifically, this disclosure relates to a high speed beam component-resolved profile and position sensitive detector.

BACKGROUND

Position sensitive detectors (PSDs) or cameras are used to determine a beam centroid and/or beam profile. When sensing the position of a multiple component laser beam (common in high energy laser (HEL) beams), misalignment of the beams relative to one another can confuse a PSD into thinking the centroid of the beam is changing when in fact perhaps only one component of the beam is becoming misaligned. A feedback loop based on just a PSD alone will steer the entire beam ensemble, incorrectly changing beam pointing to compensate. Also using a PSD alone will not provide a beam profile. While using a camera alone will provide a beam profile, it would negate the speed advantage of the high bandwidth PSD feedback for diagnostics and/or beam alignment.

SUMMARY

This disclosure provides a system and method for high speed beam component resolved profile and position sensitive detector.

In a first embodiment, a system includes a beam splitter, camera, and a position sensitive detector (PSD). The beam splitter splits a beam into a first beam portion and a second beam portion. The camera detects an image profile of the first beam portion. The PSD detects a position of the second beam portion.

In a second embodiment, a method includes splitting a beam into a first beam portion and a second beam portion using a beam splitter; detecting an image profile of the first beam portion using a camera; and detecting a position of the second beam portion using a PSD.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures described below and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure.

Figure 1:
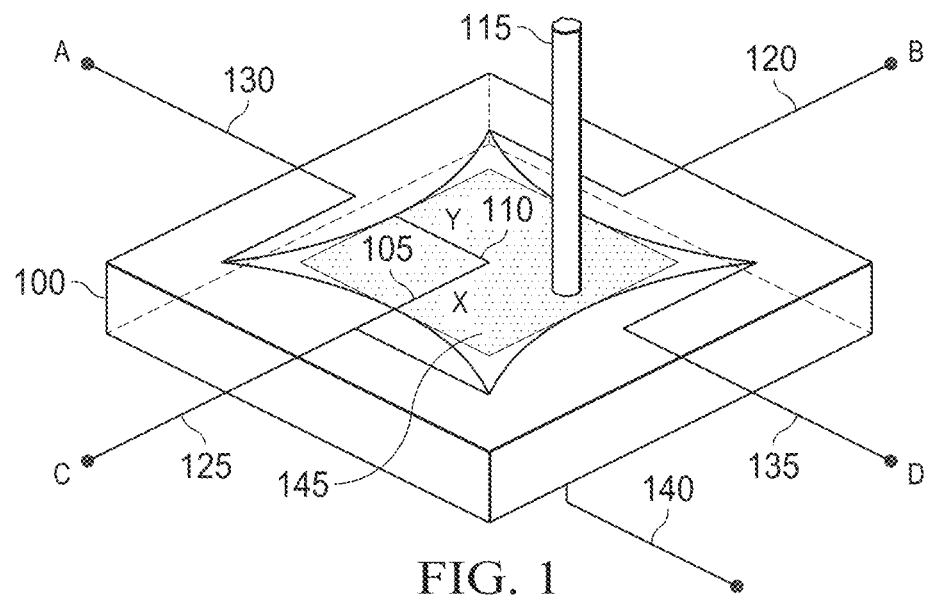
FIG. 1 illustrates an example of a PSD according to this disclosure.

FIG. 1 illustrates an example of a PSD 100 according to this disclosure. The embodiment of the PSD 100 illustrated in FIG. 1 is for illustration only. FIG. 1 does not limit the scope of this disclosure to any particular implementation of a PSD.

The PSD 100 can determine a first lateral displacement 105 and a second lateral displacement 110 of a beam ensemble 115, such as an incident light or laser. The PSD 100 can include a first electrode 120, a second electrode 125, a third electrode 130, a fourth electrode 135 and a cathode 140. The PSD 100 can also include an active area 145 in which the beam ensemble 115 can be measured.

The PSD 100 can provide a fast, high resolution analog output for tracking the centroid of a beam ensemble 115. A high speed feedback of position and angle can be beneficial for high energy laser (HEL) applications to quickly correct jitter in order to meet desired requirements. By design, a PSD 100 is a single detector element, which does not provide spatial resolution or profile information about the beam ensemble 115. This limitation can produce spurious information for a HEL composed of multiple beams in the event that one or more individual beams wander or point differently than the bulk ensemble of the beams 115.

The cathode 140 provides an electrical current into the active area 145 of the PSD 100. The beam ensemble 115 hitting the active area 145 changes the local resistance causing a change in the electron flow to the electrodes 120-135. Based on the difference in current detected at each of the electrodes 120-135, the location of the beam ensemble 115 can be determined.

The first lateral displacement 105 is perpendicular to the second lateral displacement 110. The first lateral displacement 105 of the beam ensemble 115 can be determined based on the currents from the first electrode 120 and the second electrodes 125. The second lateral displacement 110 of the beam ensemble 115 can be determined based on the current from the third electrode 130 and the fourth electrode 135.

Figure 2:
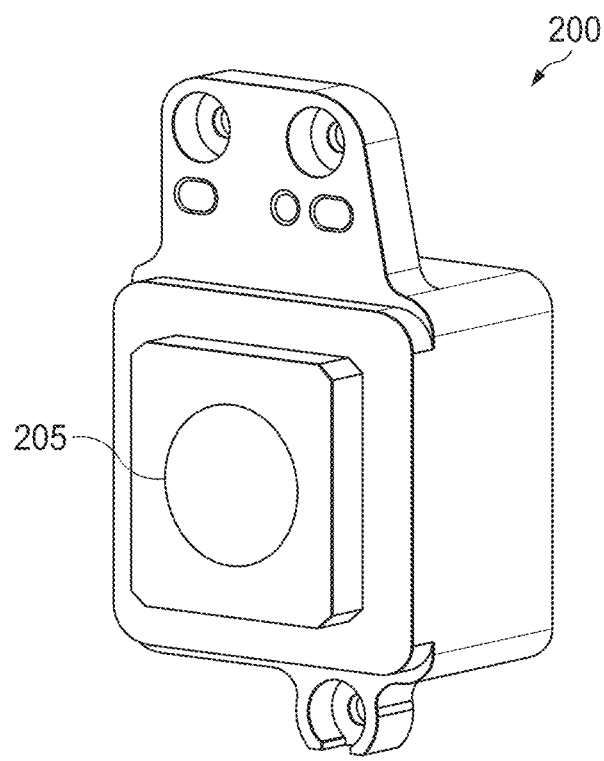
FIG. 2 illustrates an example of a camera according to this disclosure.

FIG. 2 illustrates an example of a camera 200 according to this disclosure. The embodiment of the camera 200 illustrated in FIG. 2 is for illustration only. FIG. 2 does not limit the scope of this disclosure to any particular implementation of a camera.

The camera 200 can include an optic sensor or beam splitter 205. The camera 200 can capture an image or a plurality of frames forming a video. The camera 200 can resolve the spatial profile of an incident beam or ensemble of beams. The camera image output can be processed to identify beam profile and recognize irregularities.

The camera image output is generally quite slow compared to an output of the PSD 100. Increasing the speed of the camera 200 would require reducing the field of regard, which is important for capturing context of a beam ensemble. The fast cameras also generally require fast processing of larger amounts of data compared to a PSD.

Figure 3A:
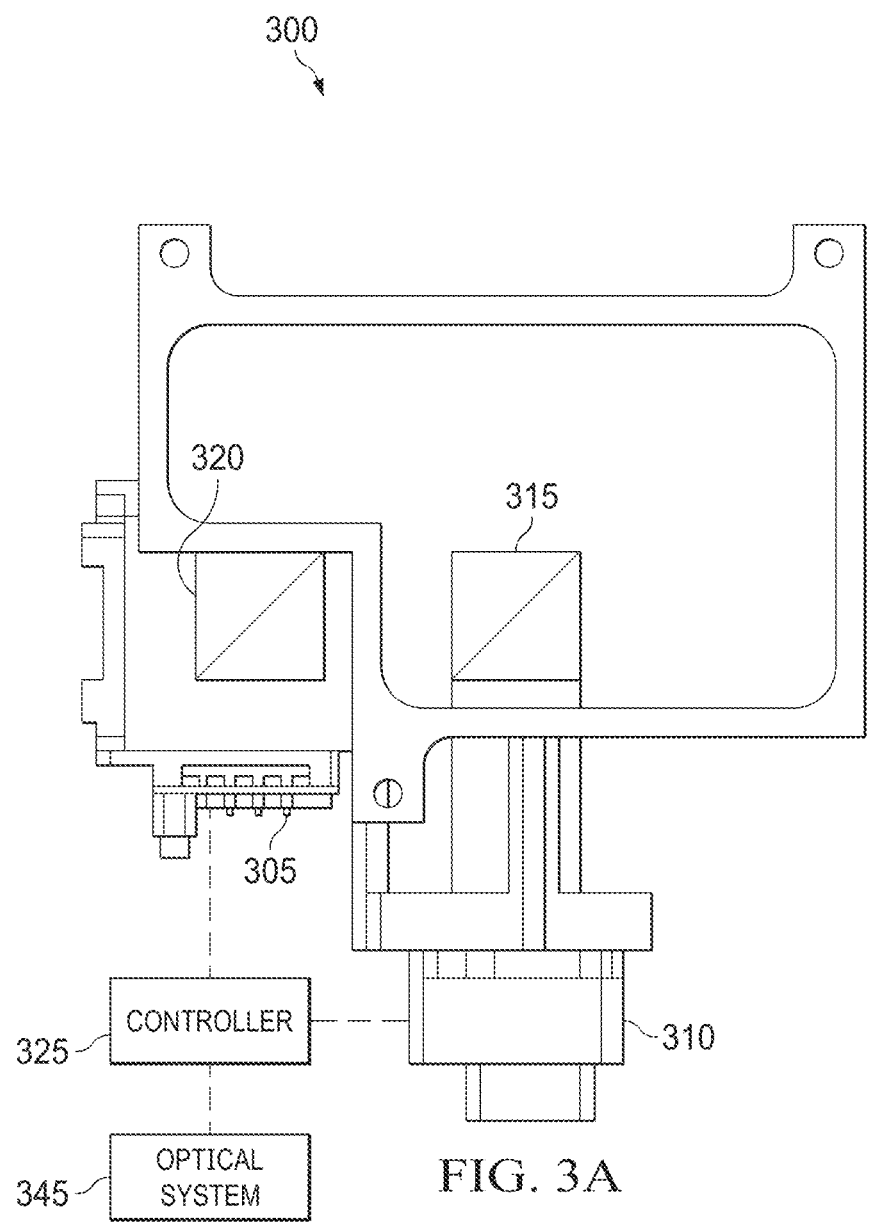
FIGS. 3A and 3B illustrate an example of a beam centroid tracker according to this disclosure.
Figure 3B:
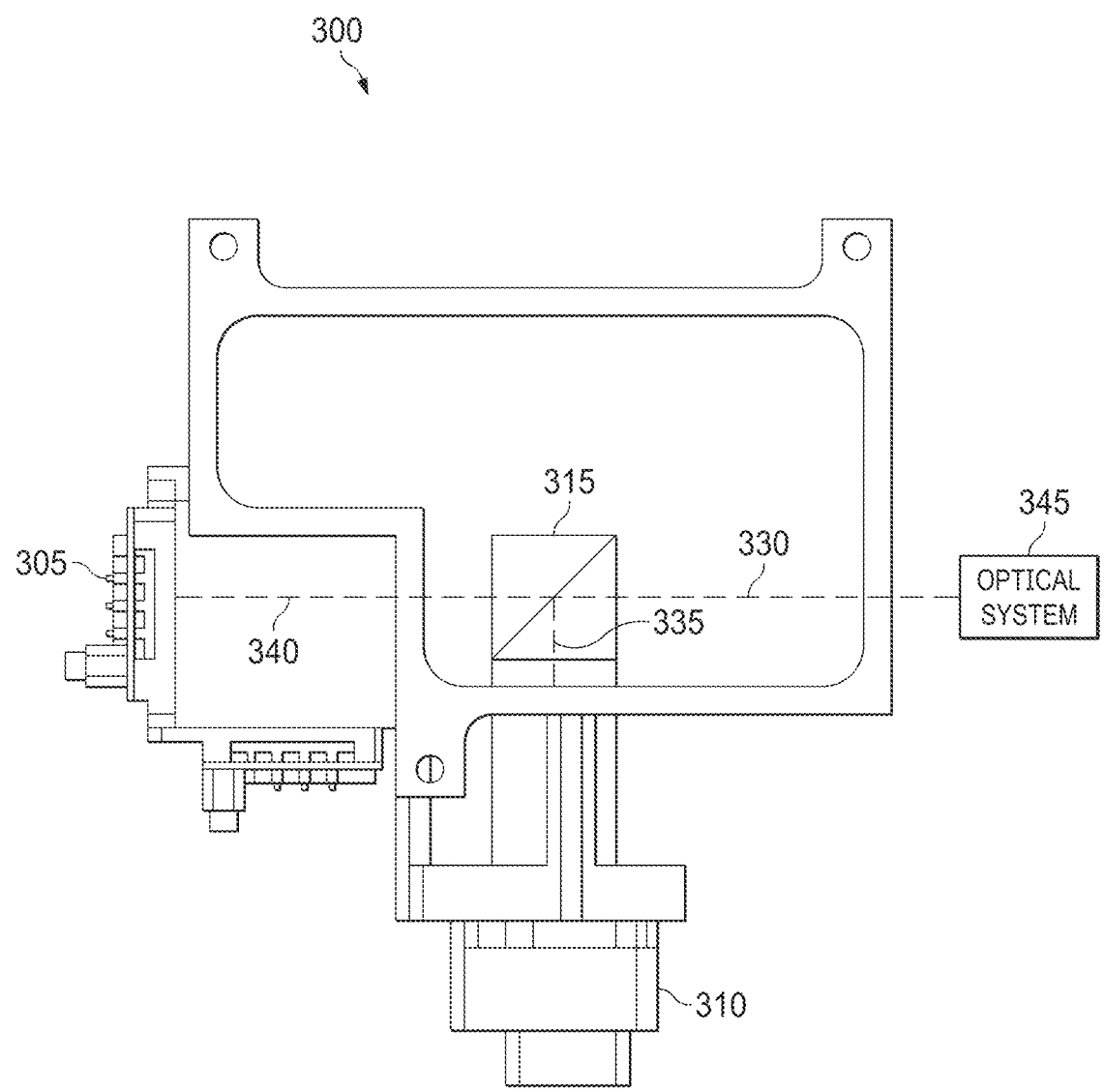

FIGS. 3A and 3B illustrate an example of a beam centroid tracker 300 according to this disclosure. The embodiments of the beam centroid tracker 300 illustrated in FIGS. 3A and 3B are for illustration only. FIGS. 3A and 3B do not limit the scope of this disclosure to any particular implementation of a beam centroid tracker.

The beam centroid tracker 300 combines use of a PSD 305 and a camera 310. The beam centroid tracker 300 also could include a first beam splitter 315, a second beam splitter 320, and a controller 325. The first beam splitter 315 and the second beam splitter 320 can split a beam ensemble 330 by deflecting a first beam portion 335 and allowing a second beam portion 340 to pass through without changing the angle. The PSD 305 and the camera 310 are located in a manner that the camera and PSD are both located at the plane of interest in the optical system 345, either the focal plane (for angular tracking) or an image plane (for position tracking).

At least one controller 325 (shown in FIG. 3A) is coupled to the PSD 305, the camera 310 and the optical system 345. Each controller 325 can control the operation of one or more of the PSD 305, the camera 310 and the optical system 345. For example, the controller 325 could receive information associated with the process system, such as sensor measurements from the PSD 305 or the camera 310 and the optical system 345. The controller 325 could use this information to generate control signals for others of the PSD 305, the camera 310 to thereby adjust the operation of the PSD 305, the camera 310 and the optical system 345. For example, the controller 325 could detect that the beam ensemble is wandering and send a signal to the optical system 345 for beam steering. Each controller 325 includes any suitable structure for controlling one or more of the PSD 305, the camera 310 and the optical system 345. Each controller 325 could, for example, represent a computing device executing multi-variable or other control logic. Each controller 325 denotes any suitable processing device, such as one or more microprocessors, microcontrollers, digital signal processors, application specific integrated circuits (ASICs), field programmable gate arrays (FPGAs), or discrete circuitry. Each controller 325 could execute any suitable instructions, such as those for determining variance of an errant beam from a beam ensemble.

Figure 4A:
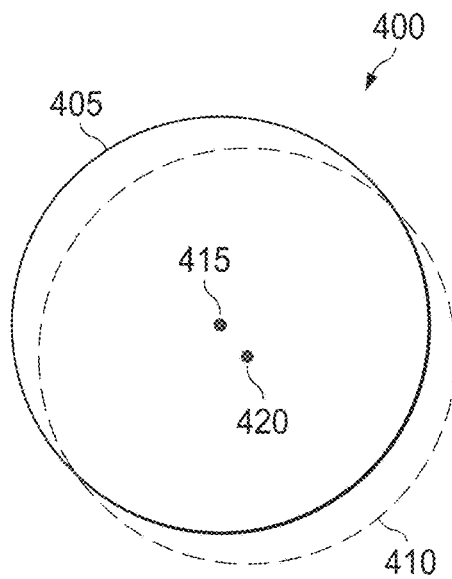
FIGS. 4A and 4B illustrate an example of beam centroid tracking according to this disclosure.
Figure 4B:
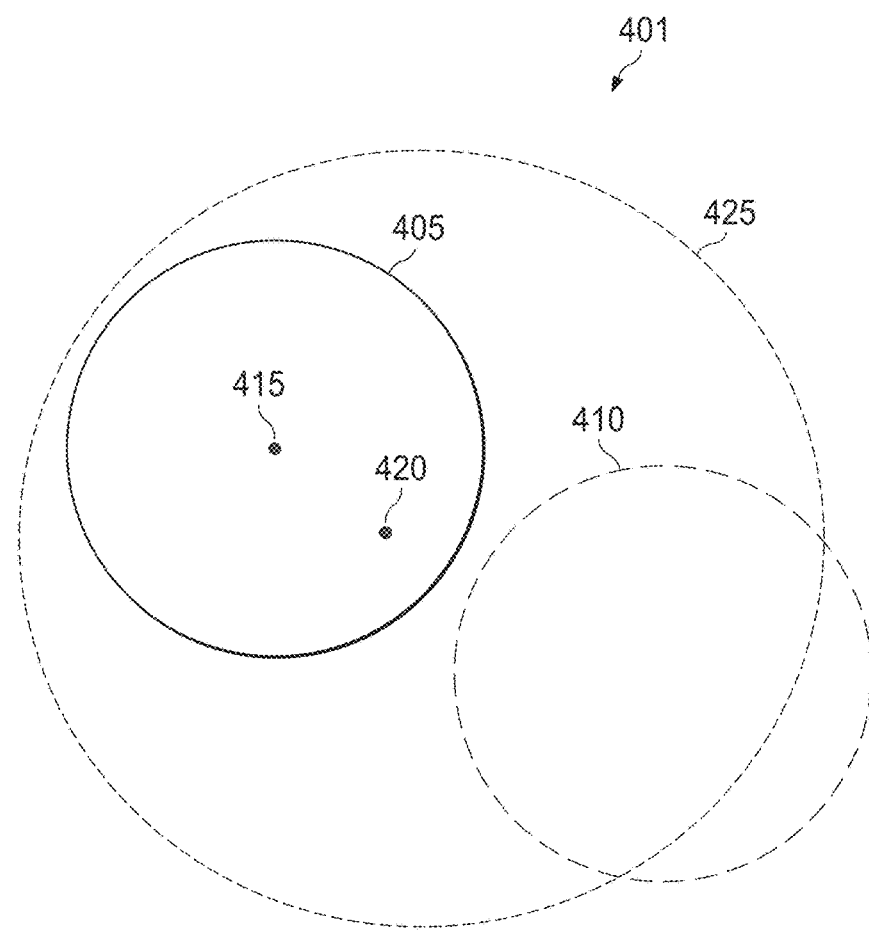

FIGS. 4A and 4B illustrate an example of beam centroid tracking 400-401 according to this disclosure. The embodiments of the beam centroid tracking 400-401 illustrated in FIGS. 4A and 4B are for illustration only. FIGS. 4A and 4B do not limit the scope of this disclosure to any particular implementation of beam centroid tracking.

The combination of the PSD 305 and the camera 310 provides for high speed, accurate beam centroid tracking 400-401 of a beam ensemble 405. The beam centroid tracking 400-401 determines that an errant beam 410 has wandered. The beam ensemble 405 has an ensemble centroid 415 when all the beams in the beam ensemble 405 are correctly aligned. When one or more errant beams 410 start moving from the beam ensemble 405, a spurious centroid 420 is detected.

The spurious centroid 420 is the averaged center of all the beams. When the spurious centroid 420 is detected, the beam centroid tracker 300 can determine that at least one beam has wandered. In other words, as a component beam of the beam ensemble 405 wanders, the (spurious) centroid 420 as detected by the PSD 305 will errantly follow the shift. The camera 310 can resolve the movement of the wandering beam and can provide a corrective offset to sensors being fed by a PSD output.

In the case of beam tracking 401, the errant beam 410 has exceeded the interlock limit, but the spurious PSD centroid 420 has not. This illustrates that a system using only the PSD 305 may not be able to determine that spurious beam has exceeded an interlock limit and will not send a shutdown signal to the controller 325.

The camera 310 can allow for the controller 325 to exclude the errant beam from pointing calculations and corrections. The controller 325 can calculate total power outside of a safety tolerance zone (angle or position) defined by the user and shut down the power if a safety threshold 425 is crossed. The camera 310 can provide multiple options for tracking compared to the safety threshold 425. If the errant beam 410 is within the safety threshold 425, the controller 325 can continue to provide offset updates, and, if the errant beam 410 is outside of the safety threshold 425, the controller 325 can trip an interlock to shut down the HEL operation.

Figure 5:
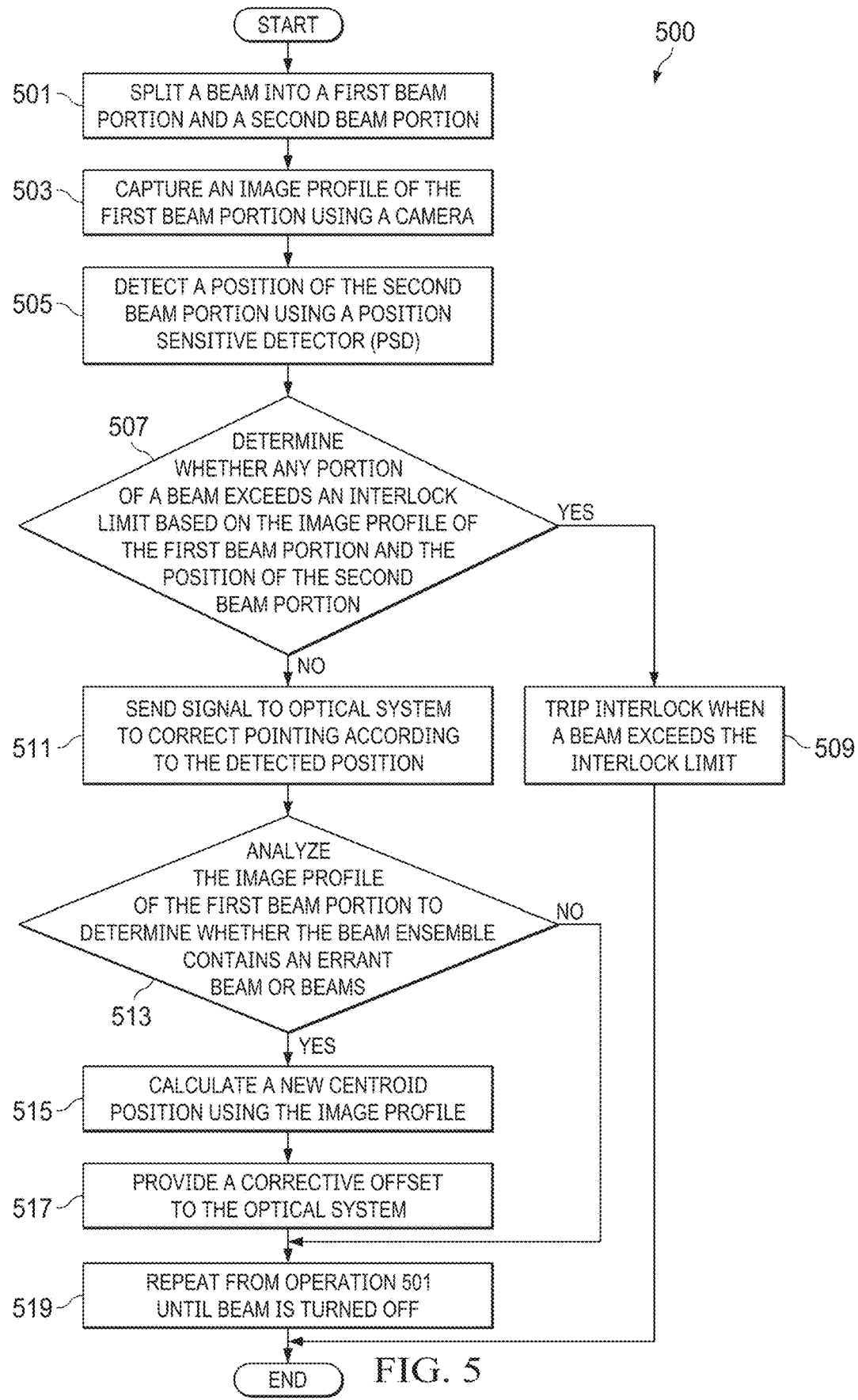
FIG. 5 illustrates an example method for beam centroid tracking according to this disclosure.

FIG. 5 illustrates an example method 500 for beam centroid tracking using a beam centroid tracker according to this disclosure. For ease of explanation, the method 500 is described as being performed using the beam centroid tracker 300 of FIG. 3. However, the method 500 could be used with any other suitable device or system.

At step 501, a beam centroid tracker 300 splits a beam ensemble 330 into a first beam portion 335 and a second beam portion 340 using a beam splitter 315. The distance of the first beam portion 335 and the second beam portion 340 from the beam splitter is such that the sensors for both the camera 310 and the PSD 305 are located at the plane of interest of the optical system (focal plane for angular sensing or image plane for position sensing).

At step 503, the beam centroid tracker 300 detects an image profile of the first beam portion 335 using the camera 310. The camera 310 can capture a frame of the location of the beam ensemble. The controller 325 can process the captured frame to determine the profile of the beam ensemble.

At step 505, the beam centroid tracker 300 can detect a position of the second beam portion using the PSD 305. The beam ensemble 330 can strike an active area 145 of the PSD 305. The electrodes 120-135 can determine a first lateral displacement 105 and a second lateral displacement 110. The first lateral displacement 105 measured is perpendicular to the second lateral displacement 110 measured. In particular, the centroid of the beam ensemble is measured.

The beam centroid tracker 300 can determine that the beam ensemble is correctly aligned based on the image profile of the first beam portion 335 and the position of the second beam portion 340 using the controller 325. When the location of the second beam portion 340 is located at a center of the active zone of the PSD 305, the controller 325 can determine that the beam ensemble is properly aligned.

In certain embodiments, the beam centroid tracker 300 can signal the optical system to power up each beam of the beam ensemble individually. The beam centroid tracker 300 can use one or both of the PSD 305 and the camera 310 to determine whether each beam is correctly aligned or errant. If one or more errant beams are detected, the beam centroid tracker 300 can transmit a signal to the optical system to not provide power to the errant beam when powering up the beam ensemble.

When a shape of the image profile of the first beam portion 335 has not changed from an original shape of the image profile captured using the camera 310 but the position of the second beam portion 340 detected by the PSD 305 has changed, the controller 325 can determine that the beam ensemble is misaligned. The beam centroid tracker 300 can detect that the shape of the image profile of the first beam portion 335 from the camera 310 has changed and can detect that the position of the second beam portion 340 from the PSD 305 has moved. Based on both the image profile of the first beam portion 335 changing and the position of the second beam portion 340 moving, the beam centroid tracker 300 can determine an errant beam has wandered from the beam ensemble. The controller 325 can provide offset updates to the optical system 345 to realign the beam ensemble. When the position of both the first and second beam portions 335 and 340 move outside a safety tolerance 425, the controller 325 can shut down the errant beam 410 or beam ensemble 405.

At step 507, the beam centroid tracker 300 can determine whether any portion of an errant beam exceeds a safety tolerance, such as an interlock limit, based on the image profile of the first beam portion and the position of the second beam portion. The beam centroid tracker 300 can receive the image profile of the first beam portion and the position of the second beam portion at the controller 325. The controller 325 can be connected to the PSD 305 and the camera 310 using a wired or wireless connection.

At step 509, the beam centroid tracker 300 can trip an interlock when an errant beam exceeds the interlock limit. When an errant beam is determined to exceed a safety tolerance based on the image profile of the first beam portion and the position of the second beam portion, the beam centroid tracker 300 can transmit a signal to the optical system to turn off the beam ensemble. The optical system can shut down the beam ensemble 405 when notified by the beam centroid tracker 300 that the errant beam 410 is outside of the safety tolerance 425.

At step 511, the beam centroid tracker 300 can transmit a signal to the optical system 345 to correct pointing according to the detected position from the PSD. The signal can include coordinates related to the current centroid and the position at which the centroid should be located.

At step 513, the beam centroid tracker 300 can analyze the image profile of the first beam portion to determine whether the first beam portion has an errant beam. The beam centroid tracker 300 can detect that the image profile of the first beam portion 335 from the camera 310 has changed shape. The beam centroid tracker 300 can detect that the position of the beam in the second beam portion 340 from the PSD 310 has moved. The beam centroid tracker 300 can determine that an errant beam is wandering based on the detection of the position of the second beam portion 340 has moved and the shape of the beam ensemble has changed from the original shape of the beam ensemble 405.

At step 515, the beam centroid tracker 300 can calculate a new centroid position using the image profile. The beam centroid tracker 300 can identify an errant beam and calculate the difference of the position for the centroid using the image profile. In the image profile, the profile of the beam ensemble can be identified as errant and the detected position of the beam ensemble can be used to determine the offset.

At step 517, the beam centroid tracker 300 can provide the corrective offset to the optical system 345 that can compensate for the error in the PSD 305 centroid position. The beam centroid tracker 300 continues to provide offset updates to the optical system 345 when the errant beam 410 is within a safety tolerance and shuts down the beam ensemble 405 when the errant beam 410 is outside of the safety tolerance 425.

Although FIG. 5 illustrates one example of a method 500 for beam centroid tracking using a beam centroid tracker, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. An apparatus comprising:
a beam splitter configured to split a beam ensemble from an optical system into a first beam portion and a second beam portion;
a camera configured to capture an image profile of the first beam portion;

a position sensitive detector (PSD) configured to detect a position of the second beam portion; and
a controller coupled to the PSD and the camera, the controller configured to:
receive the image profile of the first beam portion and the position of the second beam portion; and
determine that the beam ensemble is correctly aligned based on the image profile of the first beam portion aligning with the position of the second beam portion.

2. The apparatus of claim 1, wherein the camera and the PSD are placed in a focal plane of the optical system.

3. The apparatus of claim 1, wherein the camera and the PSD are placed in an image plane formed by the optical system.

4. The apparatus of claim 1, wherein the controller is further configured to:
compare the image profile of the first beam portion with the position of the second beam portion, and
determine that the beam ensemble is correctly aligned based on the comparison of the image profile of the first beam portion with the position of the second beam portion.

5. The apparatus of claim 4, wherein the controller is further configured to:
detect that a shape of the image profile of the first beam portion from the camera has not changed,
detect that the position of the second beam portion from the PSD has moved, and
determine that the beam ensemble is misaligned based on the detected position of the second beam portion moving and the shape of the image profile of the first beam portion not changing.

6. The apparatus of claim 5, wherein the controller is further configured to:
transmit a message to the optical system to correct pointing of the beam ensemble according to the detected position of the second beam portion.

7. The apparatus of claim 4, wherein the controller is further configured to:
detect that a shape of the image profile of the first beam portion from the camera has changed from an original shape of the beam ensemble,
detect that the position of the second beam portion from the PSD has moved, and
determine that an errant beam is wandering based on the detection that the position of the second beam portion has moved and the shape of the image profile of the first beam portion has changed from the original shape of the beam ensemble.

8. The apparatus of claim 7, wherein the controller is further configured to:
continue to provide offset updates to the optical system when the errant beam is wandering within a safety tolerance.

9. The apparatus of claim 7, wherein the controller is further configured to:
transmit, to the optical system, a message to shut down the beam ensemble when the errant beam is wandering outside a safety tolerance.

10. The apparatus of claim 4, wherein the controller is further configured to:
detect an errant beam in the beam ensemble by powering each beam in the beam ensemble individually; and
transmit a message to the optical system to power up the beam ensemble without providing power to the errant beam.

11. A method comprising:
splitting a beam ensemble from an optical system into a first beam portion and a second beam portion using a beam splitter;
capturing an image profile of the first beam portion using a camera;
detecting a position of the second beam portion using a position sensitive detector (PSD); and
determining that the beam ensemble is correctly aligned based on the image profile of the first beam portion aligning with the position of the second beam portion.

12. The method of claim 11, wherein the camera and the PSD are placed in a focal plane of the optical system.

13. The method of claim 11, wherein the camera and the PSD are placed in an image plane formed by the optical system.

14. The method of claim 11, further comprising:
comparing the image profile of the first beam portion with the position of the second beam portion; and
determining that the beam ensemble is correctly aligned based on the comparison of the image profile of the first beam portion with the position of the second beam portion.

15. The method of claim 14, further comprising:
detecting that a shape of the image profile of the first beam portion from the camera has not changed;
detecting that the position of the second beam portion from the PSD has moved; and
determining that the beam ensemble is misaligned based on detected position of the second beam portion moving and the shape of the image profile of the first beam portion not changing.

16. The method of claim 15, further comprising:
transmitting a message to the optical system to correct pointing of the beam ensemble according to the detected position of the second beam portion.

17. The method of claim 14, further comprising:
detecting that a shape of the image profile of the first beam portion from the camera has changed from an original shape of the beam ensemble;
detecting that the position of the second beam portion has moved; and
determining that an errant beam is wandering based on the detection that the position of the second beam portion has moved and the shape of the image profile of the first beam portion has changed from the original shape of the beam ensemble.

18. The method of claim 17, further comprising:
continuing to provide offset updates to the optical system when the errant beam is wandering within a safety tolerance.

19. The method of claim 17, further comprising:
transmitting, to the optical system, a message to shut down the beam ensemble when the errant beam is wandering outside a safety tolerance.

20. The method of claim 14, further comprising:
detecting an errant beam in the beam ensemble by powering each beam in the beam ensemble individually; and
transmitting a message to the optical system to power up the beam ensemble without providing power to the errant beam.

* * * * *